United States Patent [19]

Driessen

[11] Patent Number: 4,567,518

[45] Date of Patent: Jan. 28, 1986

[54] SYSTEM FOR DECODING AND DISPLAYING ENCODED TELEVISION PICTURES

[75] Inventor: Leonardus M. H. E. Driessen, Eindhoven, Netherlands

[73] Assignee: U.S. Philips Corporation, New York, N.Y.

[21] Appl. No.: 749,682

[22] Filed: Jun. 27, 1985

Related U.S. Application Data

[63] Continuation of Ser. No. 451,685, Dec. 20, 1982.

[30] Foreign Application Priority Data

Dec. 23, 1981 [NL] Netherlands ............................ 8105799

[51] Int. Cl.[4] ............................................... H04N 7/12
[52] U.S. Cl. ..................................... 358/133; 364/725; 371/2; 371/37; 382/43
[58] Field of Search ............... 358/133, 138, 260, 261; 364/725, 727; 382/43; 340/347 DD; 371/2, 37, 41, 30

[56] References Cited

U.S. PATENT DOCUMENTS

| | | | |
|---|---|---|---|
| 3,971,888 | 7/1976 | Chimg et al. | 358/133 |
| 4,179,709 | 12/1979 | Workman | 358/133 |
| 4,189,748 | 2/1980 | Reis | 358/133 |
| 4,375,650 | 3/1983 | Tiemann | 358/133 |
| 4,398,217 | 8/1983 | Peters | 358/138 |
| 4,405,936 | 9/1983 | Peters | 358/13 |
| 4,447,886 | 5/1984 | Meeker | 358/133 |
| 4,463,377 | 7/1984 | Myer-Ebrecht et al. | 358/133 |

Primary Examiner—Edward L. Coles, Sr.
Attorney, Agent, or Firm—Thomas A. Briody; William J. Streeter; Marianne Rich

[57] ABSTRACT

An error protection code which acts on subpictures for the transmission of television picture information. First the picture is subpicture-wise transformed (124) by means of transformation functions, for example, Hadamard functions. Of the coefficients thus formed, a number of most significant coefficient bits which are associated with low frequency transformation functions are protected against a bit error (126). Moreover, a comparatively small number of coefficient bits within said number are protected against an additional bit error.

5 Claims, 17 Drawing Figures

| | | | | | |
|---|---|---|---|---|---|
| 9 | 6 | 6 | 5 | 9 | 0 |
| 3 | 2 | 3 | 3 | 4 | 1 |
| 4 | 4 | 4 | 3 | 5 | 2 |
| 4 | 3 | 3 | 3 | 4 | 3 |
| 3 | 3 | 3 | 3 | 4 | 4 |
| 0 | 2 | 2 | 2 | 2 | 5 |
| 0 | 0 | 0 | 2 | 5 | 6 |
| 0 | 0 | 0 | 0 | 5 | 7 |
| 4 | 4 | 4 | 4 | 5 | 8 |
| 0 | 2 | 2 | 2 | 1 | 9 |
| 3 | 2 | 2 | 2 | 3 | 10 |
| 2 | 2 | 2 | 2 | 1 | 11 |
| 4 | 4 | 3 | 3 | 4 | 12 |
| 0 | 2 | 2 | 2 | 1 | 13 |
| 2 | 2 | 2 | 2 | 1 | 14 |
| 0 | 0 | 0 | 0 | 0 | 15 |
| 52 | 54 | 56 | 58 | 60 | 62 |

FIG.5

$$[G] = \begin{pmatrix} 0 & 0 & 1 & 0 & 0 & 0 & 1 & 0 & 0 & 1 & 1 & 1 \\ 0 & 0 & 0 & 1 & 0 & 0 & 0 & 1 & 1 & 0 & 1 & 1 \\ 1 & 0 & 1 & 0 & 1 & 0 & 1 & 0 & 0 & 0 & 0 & 0 \\ 0 & 1 & 0 & 1 & 0 & 1 & 0 & 1 & 0 & 0 & 0 & 0 \\ 0 & 0 & 0 & 0 & 1 & 0 & 1 & 0 & 1 & 0 & 1 & 0 \\ 0 & 0 & 0 & 0 & 0 & 1 & 0 & 1 & 0 & 1 & 0 & 1 \end{pmatrix}$$

FIG.6

|  66  |  64  |  68 |     |     |    |
|---|---|---|---|---|---|
| 1 | 2 | 3 | 1 | 2 | 3 |
| 000001 | 000001010101 | 4 | 100101 | 011100100010 | 5 |
| 000010 | 000010101010 | 4 | 100110 | 011111011101 | 9 |
| 000011 | 000011111111 | 8 | 100111 | 011110001000 | 5 |
| 000100 | 010101010000 | 4 | 101000 | 100010000111 | 5 |
| 000101 | 010100000101 | 4 | 101001 | 100011010010 | 5 |
| 000110 | 010111111010 | 8 | 101010 | 100000101101 | 5 |
| 000111 | 010110101111 | 8 | 101011 | 100001111000 | 5 |
| 001000 | 101010100000 | 4 | 101100 | 110111010111 | 9 |
| 001001 | 101011110101 | 8 | 101101 | 110110000010 | 5 |
| 001010 | 101000001010 | 4 | 101110 | 110101111101 | 9 |
| 001011 | 101001011111 | 8 | 101111 | 110100101000 | 5 |
| 001100 | 111111110000 | 8 | 110000 | 001100111100 | 6 |
| 001101 | 111110100101 | 8 | 110001 | 001101101001 | 6 |
| 001110 | 111101011010 | 8 | 110010 | 001110010110 | 6 |
| 001111 | 111100001111 | 8 | 110011 | 001111000011 | 6 |
| 010000 | 000100011011 | 5 | 110100 | 011001101100 | 6 |
| 010001 | 000101001110 | 5 | 110101 | 011000111001 | 6 |
| 010010 | 000110110001 | 5 | 110110 | 011011000110 | 6 |
| 010011 | 000111100100 | 5 | 110111 | 011010010011 | 6 |
| 010100 | 010001001011 | 5 | 111000 | 100110011100 | 6 |
| 010101 | 010000011110 | 5 | 111001 | 100111001001 | 6 |
| 010110 | 010011100001 | 5 | 111010 | 100100110110 | 6 |
| 010111 | 010010110100 | 5 | 111011 | 100101100011 | 6 |
| 011000 | 101110111011 | 9 | 111100 | 110011001100 | 6 |
| 011001 | 101111101110 | 9 | 111101 | 110010011001 | 6 |
| 011010 | 101100010001 | 5 | 111110 | 110001100110 | 6 |
| 011011 | 101101000100 | 5 | 111111 | 110000110011 | 6 |
| 011100 | 111011101011 | 9 | 000000 | 000000000000 | 0 |
| 011101 | 111010111110 | 9 |  |  |  |
| 011110 | 111001000001 | 5 |  |  |  |
| 011111 | 111000010100 | 5 |  |  |  |
| 100000 | 001000100111 | 5 |  |  |  |
| 100001 | 001001110010 | 5 |  |  |  |
| 100010 | 001010001101 | 5 |  |  |  |
| 100011 | 001011011000 | 5 |  |  |  |
| 100100 | 011101110111 | 9 |  |  |  |

FIG. 7

$$[H] = \begin{pmatrix} 1 & 1 & 0 & 0 & 0 & 1 \\ 1 & 1 & 0 & 0 & 1 & 0 \\ 1 & 0 & 0 & 0 & 0 & 1 \\ 0 & 1 & 0 & 0 & 1 & 0 \\ 0 & 1 & 0 & 1 & 0 & 1 \\ 1 & 0 & 1 & 0 & 1 & 0 \\ 0 & 0 & 0 & 1 & 0 & 1 \\ 0 & 0 & 1 & 0 & 1 & 0 \\ 0 & 1 & 0 & 1 & 0 & 0 \\ 1 & 0 & 1 & 0 & 0 & 0 \\ 0 & 0 & 0 & 1 & 0 & 0 \\ 0 & 0 & 1 & 0 & 0 & 0 \end{pmatrix}$$

| 1 | 2 | 3 | | 1 | 2 | 3 | | | |
|---|---|---|---|---|---|---|---|---|---|
| 0 | 000000 | no errors | | 32 | 100000 | 1, 3 ; | 5, 7 ; | 9,11; | |
| 1 | 000001 | 4, 8 ; 6, 10 ; | | 33 | 100001 | 2 ; | | | |
| 2 | 000010 | 5, 9 ; 7, 11 ; | | 34 | 100010 | 5,11 ; | 7, 9 ; | | |
| 3 | 000011 | 0, 1 ; | | 35 | 100011 | 0, 3 ; | | | |
| 4 | 000100 | 10 ; | | 36 | 100100 | 0, 4 ; | 2, 6 ; | | |
| 5 | 000101 | 6 ; | | 37 | 100101 | 0, 8 ; | 2,10 ; | | |
| 6 | 000110 | 3, 8 ; | | 38 | 100110 | 1, 8 ; | | | |
| 7 | 000111 | 3, 4 ; | | 39 | 100111 | 1, 4 ; | | | |
| 8 | 001000 | 11 ; | | 40 | 101000 | 9 ; | | | |
| 9 | 001001 | 2, 9 ; | | 41 | 101001 | 2,11 ; | | | |
| 10 | 001010 | 7 ; | | 42 | 101010 | 5 ; | | | |
| 11 | 001011 | 2, 5 ; | | 43 | 101011 | 2, 7 ; | | | |
| 12 | 001100 | 10,11 ; | | 44 | 101100 | 9,10 ; | | | |
| 13 | 001101 | 6,11 ; | | 45 | 101101 | 6, 9 ; | | | |
| 14 | 001110 | 7,10 ; | | 46 | 101110 | 5,10 ; | | | |
| 15 | 001111 | 6, 7 ; | | 47 | 101111 | 5, 6 ; | | | |
| 16 | 010000 | 0, 2 ; 4, 6 ; 8, 10 ; | | 48 | 110000 | 0,4,8; | 1,5,9; | etc. | |
| 17 | 010001 | 4,10 ; 6, 8 ; | | 49 | 110001 | 0 ; | | | |
| 18 | 010010 | 3 ; | | 50 | 110010 | 1 ; | | | |
| 19 | 010011 | 1, 2 ; | | 51 | 110011 | 2, 3 ; | | | |
| 20 | 010100 | 8 ; | | 52 | 110100 | 0, 6 ; | 2, 4 ; | | |
| 21 | 010101 | 4 ; | | 53 | 110101 | 0,10 ; | 2, 8 ; | | |
| 22 | 010110 | 3,10 ; | | 54 | 110110 | 1,10 ; | | | |
| 23 | 010111 | 3, 6 ; | | 55 | 110111 | 1, 6 ; | | | |
| 24 | 011000 | 1, 5 ; 3, 7 ; | | 56 | 111000 | 1, 7 ; | 3, 5 ; | | |
| 25 | 011001 | 0, 9 ; | | 57 | 111001 | 0,11 ; | | | |
| 26 | 011010 | 1, 9 ; 3,11 ; | | 58 | 111010 | 1,11 ; | 3, 9 ; | | |
| 27 | 011011 | 0, 5 ; | | 59 | 111011 | 0, 7 ; | | | |
| 28 | 011100 | 8,11 ; | | 60 | 111100 | 8, 9 ; | | | |
| 29 | 011101 | 4,11 ; | | 61 | 111101 | 4, 9 ; | | | |
| 30 | 011110 | 7, 8 ; | | 62 | 111110 | 5, 8 ; | | | |
| 31 | 011111 | 4, 7 ; | | 63 | 111111 | 4, 5 ; | | | |

FIG. 10

| 1 | 2 | 3 | 4 | 5 | 6 | 1 | 2 | 3 | 4 | 5 | 6 |
|---|---|---|---|---|---|---|---|---|---|---|---|
| 0 | 000000 | 000000 | 000 | 0 | 0 | 32 | 100000 | 000000 | 111 | 0 | 7 |
| 1 | 000001 | 000000 | 100 | 0 | 4 | 33 | 100001 | 001000 | 000 | 8 | 0 |
| 2 | 000010 | 000000 | 101 | 0 | 5 | 34 | 100010 | 000000 | 101 | 0 | 5 |
| 3 | 000011 | 110000 | 000 | 48 | 0 | 35 | 100011 | 100100 | 000 | 36 | 0 |
| 4 | 000100 | 000000 | 000 | 0 | 0 | 36 | 100100 | 001000 | 010 | 8 | 2 |
| 5 | 000101 | 000000 | 000 | 0 | 0 | 37 | 100101 | 100000 | 110 | 32 | 6 |
| 6 | 000110 | 000100 | 000 | 4 | 0 | 38 | 100110 | 010000 | 000 | 16 | 0 |
| 7 | 000111 | 000110 | 000 | 6 | 0 | 39 | 100111 | 010010 | 000 | 18 | 0 |
| 8 | 001000 | 000000 | 000 | 0 | 0 | 40 | 101000 | 000000 | 000 | 0 | 0 |
| 9 | 001001 | 001000 | 000 | 8 | 0 | 41 | 101001 | 001000 | 000 | 8 | 0 |
| 10 | 001010 | 000000 | 000 | 0 | 0 | 42 | 101010 | 000001 | 000 | 1 | 0 |
| 11 | 001011 | 001001 | 000 | 9 | 0 | 43 | 101011 | 001000 | 000 | 8 | 0 |
| 12 | 001100 | 000000 | 000 | 0 | 0 | 44 | 101100 | 000000 | 000 | 0 | 0 |
| 13 | 001101 | 000000 | 000 | 0 | 0 | 45 | 101101 | 000000 | 000 | 0 | 0 |
| 14 | 001110 | 000000 | 000 | 0 | 0 | 46 | 101110 | 000001 | 000 | 1 | 0 |
| 15 | 001111 | 000000 | 000 | 0 | 0 | 47 | 101111 | 000001 | 000 | 1 | 0 |
| 16 | 010000 | 000000 | 110 | 0 | 6 | 48 | 110000 | 000000 | 001 | 0 | 1 |
| 17 | 010001 | 000000 | 100 | 0 | 4 | 49 | 110001 | 100000 | 000 | 32 | 0 |
| 18 | 010010 | 000100 | 000 | 4 | 0 | 50 | 110010 | 010000 | 000 | 16 | 0 |
| 19 | 010011 | 011000 | 000 | 24 | 0 | 51 | 110011 | 001100 | 000 | 12 | 0 |
| 20 | 010100 | 000000 | 000 | 0 | 0 | 52 | 110100 | 100000 | 010 | 32 | 2 |
| 21 | 010101 | 000010 | 000 | 2 | 0 | 53 | 110101 | 100000 | 110 | 32 | 6 |
| 22 | 010110 | 000100 | 000 | 4 | 0 | 54 | 110110 | 010000 | 000 | 16 | 0 |
| 23 | 010111 | 000100 | 000 | 4 | 0 | 55 | 110111 | 010000 | 000 | 16 | 0 |
| 24 | 011000 | 000100 | 011 | 4 | 3 | 56 | 111000 | 010000 | 011 | 16 | 3 |
| 25 | 011001 | 100000 | 000 | 32 | 0 | 57 | 111001 | 100000 | 000 | 32 | 0 |
| 26 | 011010 | 010000 | 111 | 16 | 7 | 58 | 111010 | 010000 | 111 | 16 | 7 |
| 27 | 011011 | 100001 | 000 | 33 | 0 | 59 | 111011 | 100000 | 000 | 32 | 0 |
| 28 | 011100 | 000000 | 000 | 0 | 0 | 60 | 111100 | 000000 | 000 | 0 | 0 |
| 29 | 011101 | 000010 | 000 | 2 | 0 | 61 | 111101 | 000010 | 000 | 2 | 0 |
| 30 | 011110 | 000000 | 000 | 0 | 0 | 62 | 111110 | 000001 | 000 | 1 | 0 |
| 31 | 011111 | 000010 | 000 | 2 | 0 | 63 | 111111 | 000011 | 000 | 3 | 0 |

FIG. 13

$$[G] = \begin{pmatrix} 1 & 1 & 0 & 0 & 1 & 0 & 0 & 1 & 1 & 1 & 0 \\ 0 & 1 & 1 & 0 & 0 & 1 & 0 & 1 & 0 & 0 & 1 \\ 0 & 0 & 0 & 0 & 0 & 0 & 1 & 0 & 1 & 0 & 1 & 1 \\ 1 & 1 & 1 & 1 & 0 & 0 & 0 & 0 & 0 & 0 & 0 \end{pmatrix}$$

| | | |
|---|---|---|
| 7 | 2 | 54 |
| 8 | 2 | 64 |
| 8 | 3 | 544 |
| 9 | 2 | 74 |
| 9 | 3 | 554 |
| 9 | 4 | 5444 |
| 10 | 2 | 76 |
| 10 | 3 | 664 |
| 10 | 4 | 5544 |
| 10 | 5 | 54444 |
| 11 | 2 | 86,94 |
| 11 | 3 | 764 |
| 11 | 4 | 6644 |
| 11 | 5 | 55444 |
| 12 | 2 | 96 |
| 12 | 3 | 766 |
| 12 | 4 | 7644 |
| 12 | 5 | 55554 |
| 12 | 6 | 554444 |

$$C_0 = m_2$$
$$C_1 = m_3$$
$$C_2 = m_2 + m_0$$
$$C_3 = m_3 + m_1$$
$$C_4 = m_4 + m_2$$
$$C_5 = m_5 + m_3$$
$$C_6 = m_4 + m_2 + m_0$$
$$C_7 = m_5 + m_3 + m_1$$
$$C_8 = m_4 + m_1$$
$$C_9 = m_5 + m_0$$
$$C_{10} = m_4 + m_1 + m_0$$
$$C_{11} = m_5 + m_1 + m_0$$

$m_0$:
1) $\hat{C}_0 + \hat{C}_2$
2) $\hat{C}_4 + \hat{C}_6$
3) $\hat{C}_8 + \hat{C}_{10}$
4) $\hat{C}_1 + \hat{C}_5 + \hat{C}_9$
5) if $\hat{C}_1 + \hat{C}_5 + \hat{C}_9 = \hat{C}_1 + \hat{C}_7 + \hat{C}_{11} = \hat{C}_3 + \hat{C}_5 + \hat{C}_{11}$,
   then $\hat{C}_1 + \hat{C}_5 + \hat{C}_9$ else $1 + \hat{C}_1 + \hat{C}_5 + \hat{C}_9$.

$m_1$:
1) $\hat{C}_1 + \hat{C}_3$
2) $\hat{C}_5 + \hat{C}_7$
3) $\hat{C}_9 + \hat{C}_{11}$
4) $\hat{C}_0 + \hat{C}_4 + \hat{C}_8$
5) if $\hat{C}_0 + \hat{C}_4 + \hat{C}_8 = \hat{C}_0 + \hat{C}_6 + \hat{C}_{10} = \hat{C}_2 + \hat{C}_4 + \hat{C}_{10}$,
   then $\hat{C}_0 + \hat{C}_4 + \hat{C}_8$ else $1 + \hat{C}_0 + \hat{C}_4 + \hat{C}_8$.

$m_2$:
1) $\hat{C}_0$
2) $\hat{C}_2 + m_0$
3) $\hat{C}_4 + \hat{C}_8 + m_1$
4) $\hat{C}_6 + \hat{C}_{10} + m_1$ $m_3$:
1) $\hat{C}_1$
2) $\hat{C}_3 + m_1$
3) $\hat{C}_5 + \hat{C}_9 + m_0$
4) $\hat{C}_7 + \hat{C}_{11} + m_0$ $m_4$:
1) $\hat{C}_0 + \hat{C}_4$
2) $\hat{C}_2 + \hat{C}_6$
3) $\hat{C}_8 + m_1$
4) $\hat{C}_{10} + m_1 + m_0$ $m_5$:
1) $\hat{C}_1 + \hat{C}_5$
2) $\hat{C}_3 + \hat{C}_7$
3) $\hat{C}_9 + m_0$
4) $\hat{C}_{11} + m_0 + m_1$

FIG.17

SYSTEM FOR DECODING AND DISPLAYING ENCODED TELEVISION PICTURES

This is a continuation of application Ser. No. 451,685, filed Dec. 20, 1982.

BACKGROUND OF THE INVENTION

1. Field of the Invention

The invention relates to a system for receiving and decoding television picture information transmitted as a first series of coefficients of a second series of transformation functions into which the television picture information is transformed subpicture-wise, the transmitting system comprising a picture converting device which comprises a transformation device for the subpicture-wise transformation of the television picture for application to a transmission. Specifically it relates to decoder apparatus for reconstructing, from the subpicture-wise organized first series of coefficients, the television picture information organized in television lines and in pixels within a television line for the purpose of display. The transmission medium may be a communications channel, for example, a bundle of telephone lines, or a storage medium, for example, a magnetic tape within a video cassette recorder (VCR).

DESCRIPTION OF THE PRIOR ART

A system for performing such transformation is disclosed in an article by H. Bacchi et al, Real-time orthogonal transformation of colour-television pictures, *Philips Technical Review*, Volume 38, 1978/79, pages 119-130. Such encoding serves to limit the redundancy of the picture information so that the bit rate on a transport medium, or the number of bits to be stored on a storage medium may be, for example, a factor four smaller without the subjective display quality being substantially reduced. For the transformation functions use is preferably made of Hotelling, Fourier, Hadamard and Haar functions; in the following example only Hadamard functions and matrices are considered, because they allow for simpler arithmetical operations. The reduction of the redundancy leads to a higher susceptibility to errors. Certain errors are subjectively experienced as being hardly annoying and other errors as very annoying. It is the object of the invention to enable correction in the coefficients pertaining to a single subpicture of at least one bit error in a first number of important coefficient bits, and at least one further bit error in a selection of very important coefficient bits from said first number, without utilizing excessive redundancy and hence without substantial addition of equipment.

The object in accordance with the invention is achieved in that in the transmitter the transformation device comprises an encoder having a redundancy generator for the redundant encoding of the coefficients bits pertaining to a single subpicture to be block-wise supplied to the transmission medium, notably of a first number of coefficient bits thereof which are associated with at least one lowest frequency transformation function of the second series as most significant bits of the associated coefficient(s), in order to obtain a second number of code bits of an error correction code which has been increased by a second number of redundancy bits and which has a first minimum Hamming distance which equals at least four, a second minimum Hamming distance thus being formed for a third, smaller predetermined number within said first predetermined number of coefficient bits, said second minimum Hamming distance being at least one higher than the first minimum Hamming distance, the decoder includes a syndrome generator and a corrector in order to render, from a fourth number of code bits which equals the sum of the first and the second number of bits, at least one bit error in said first number of coefficient bits blockwise correctable and also at least one further bit error in said third number of coefficient bits. As is known, one bit error can be corrected in the case of a minimum Hamming distance of four and, in conjunction therewith, two bit errors can be detected. Coefficient bits are to be understood to mean herein bits which form the binary coded coefficients of the transformation bits. Data bits are to be understood to mean herein the bits which are applied to the encoder of the error correction code in order to be encoded. Code bits are to be understood to mean herein the bits which form the output result of the encoder or the information supplied for the decoder. The bits which results from the analog-to-digital conversion of the picture information before it is applied to the transformation device will not be considered, and the bits which are formed after the implementation of the error correction code in order to adapt the signal to be transmitted to the specific properties of the transmission medium (modulation bits) will not be considered either.

In a particular embodiment of a system of the kind described in the preamble, it is proposed to activate the encoder selectively, under the control of subpicture-wise received television picture information, to operate in one of a fifth number of transformation modes, a unique set of numbers of coefficient bits being added to the relevant elements of the second series of transformation functions in each transformation mode, a signalling bit group also being applied to the transmission medium in order to indicate the transformation mode thus activated. This is described in the prior unpublished Netherlands Patent Application 8003873 (PHN 9789) which corresponds to the U.S. patent application Ser. No. 278,235 in the name of Applicant which is incorporated herein by way of reference. The earlier system has a normal mode in which information is transported only as a small number of bits, for example, as a 0 bit or a 1 bit. In occasional cases this is not sufficient and for one (or some) blocks a change-over is made to an auxiliary mode. For some transformation functions the number of coefficient bits is then increased at the expense of other transformation functions. It is attractive to include the signalling bit group, together with the first number of coefficient bits, in the error correction code so that the selection of the incident modes is protected.

In a further particular embodiment of a system of the kind described in the preamble it is proposed, for use with colour television picture information which is sampled in the converter with a sample frequency fs which equals twice the colour subcarrier frequency fsc at instants which coincide with the phase positions $\pm\pi/4 + M\pi$, in which $M = 0, 1, 2, \ldots$, of the colour information signal u(t) in the line signal, that the transformation functions are Hadamard functions. This is described in the prior unpublished Netherlands Patent Application 8004521 (PHN 9804) and the corresponding U.S. patent application Ser. No. 288,231 in the name of Applicant which is incorporated herein by way of reference. According to the earlier system, the colour difference signal is embodied in only a very small number of coefficients, for example, in only two coefficients.

In that case it is attractive to include the most significant coefficient bit of each of the two transformation functions representing the colour difference information in the error correction code.

Preferably, the third number of coefficient bits consists of the most significant coefficient bits of the transformation function which indicates the mean luminance of the relevant subpicture. It has been found that the protection of these most significant bits offers a good subjective result. The number of bit errors to be corrected preferably equals the number of bits forming the third number of coefficient bits.

The invention also relates to a picture converting device for use in a system of the described kind in which the encoder forms a non-systematic code. It has been found that, contrary to many other cases, the non-systematic code then offers an attractive compromise between means and results. Preferably, the number of data bits protected by the error correction code amounts to six and said second number preferably also amounts to six. This results in a simple implementation with usually adequate correction possibilities.

The invention also relates to a display apparatus for use in a system of the described kind in which the decoder forms a feasible series of data bits on the basis of at least one series of a the fourth number of code bits which has been found to be incorrect but not correctable. Sometimes the correction is then correctly performed but sometimes also incorrectly. However, it has been found that in many cases the third number of coefficient bits can still be correctly recovered.

The invention also relates to a decoder for use in a system or a display apparatus of the described which is constructed as a switching module. It may be a single integrated circuit or, for example, a module consisting of several integrated circuits.

BRIEF DESCRIPTION OF THE FIGURES

The invention will be described in detail hereinafter with reference to some Figures.

FIG. 5 shows five possibilities for the numbers of coefficient bits to be added to the relevant elements of the series of transformation functions, FIG. 6 shows the generator matrix of a specimen code, FIG. 7 shows the set of code words formed for this code, FIG. 10 shows a table with the syndrome words which can be formed, FIG. 13 shows a table with syndrome words and associated error indication bits.

FIG. 17 shows the relationship between code bits and (guessed) data bits for the FIGS. 6, 9.

BRIEF DESCRIPTION OF THE SYSTEM

Figure 1:
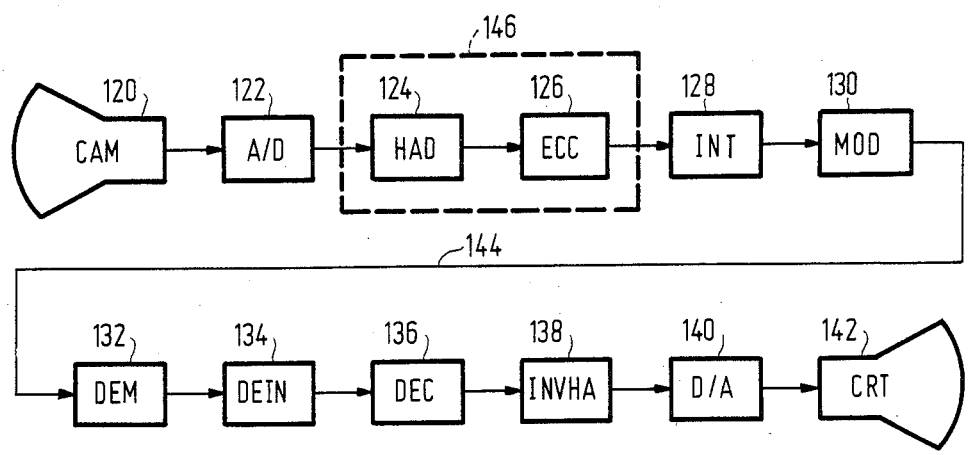
FIG. 1 diagrammatically shows a system in which the invention can be incorporated.

FIG. 1 diagrammatically shows a system in which the invention can be incorporated. Element 120 is a camera tube. The signal which is scanned line-wise is converted into a digital representation in element 122. Transformation device 146 first of all comprises a Hadamard transformation device 124 and an encoder 126 for an error correction code as will be described hereinafter. Block 128 represents an interleaving device for spreading over a larger time interval faults cause by burst errors. Block 130 represents a modulator for converting the series of code bits received into channel symbols: this series is thus adapted to the properties of the transmission medium. For example, given lower limits are implemented as regards the length of intervals without transitions (run length limitation). Line 144 represents the transmission medium which may be a storage medium or, for example, a communication channel. The elements 120 to 130 may together form part of a picture converting device, for example, a camera. Block 132 represents a demodulator for recovering the code bits from the series of channel symbols regenerated. Element 134 represents the opposite member of the block 128 and serves for de-interleaving . Element 136 represents the decoder for reconstructing or choosing the data bits from the code bits. Element 138 forms the opposite member of the block 124 for cancelling the Hadamard transformation and for recovering a binary coded amplitude signal per pixel. Element 140 represents a digital-to-analog converter. Element 142 represents the display element which is in this case constructed as a cathode ray tube. The elements 132 to 142 may form part of a display apparatus.

DESCRIPTION OF THE TRANSFORMATION FUNCTIONS

Figure 2:
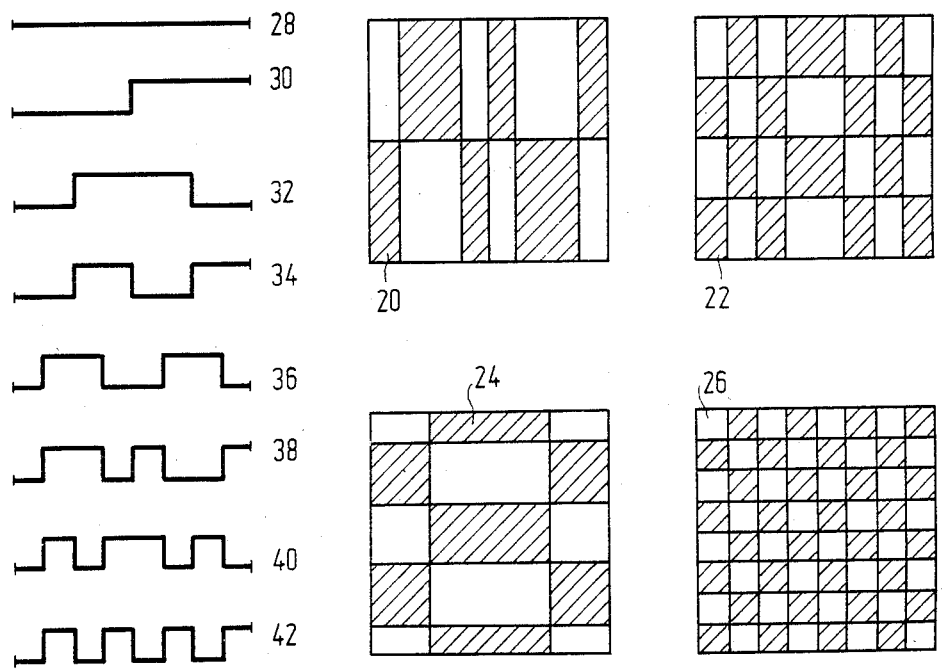
FIG. 2 shows, as background information, some possibilities for the coding of a subpicture by means of Hadamard functions.

For background information FIG. 2 shows some possibilities for the encoding of a subpicture by means of so-called Hadamard functions. The first eight Hadamard functions are shown over a unit time interval at the left of the Figure with bivalent amplitude (0, 1). This row of functions can be indefinitely continued. It can be demonstrated that an arbitrary function can be approximated with any desired accuracy over the unit interval by means of a series of Hadamard functions with adapted amplitude. The same is applicable to a two-dimensional subpicture, four of which are denoted by the reference numerals 20, 22, 24, 26, with bivalent density (white and shaded). Block 20 has an intensity which varies in the horizontal direction according to the function 38 and in the vertical direction according to the function 30: code 3830. The other blocks have the following codes 22: 4034; 24: 3236; 26: 4242. In the approximation of an arbitrary monochrome intensity distribution in the subpicture, the coefficients of the higher order Hadamard functions are almost always relatively small. Such a code can also be used for a polychrome picture (generally trichrome in the case of television pictures). In addition to the luminance signal two colour difference signals are applicable (for red and for blue). The variation of these colour difference signals can also be approximated by means of a series of Hadamard functions with suitable coefficients.

Figure 3:
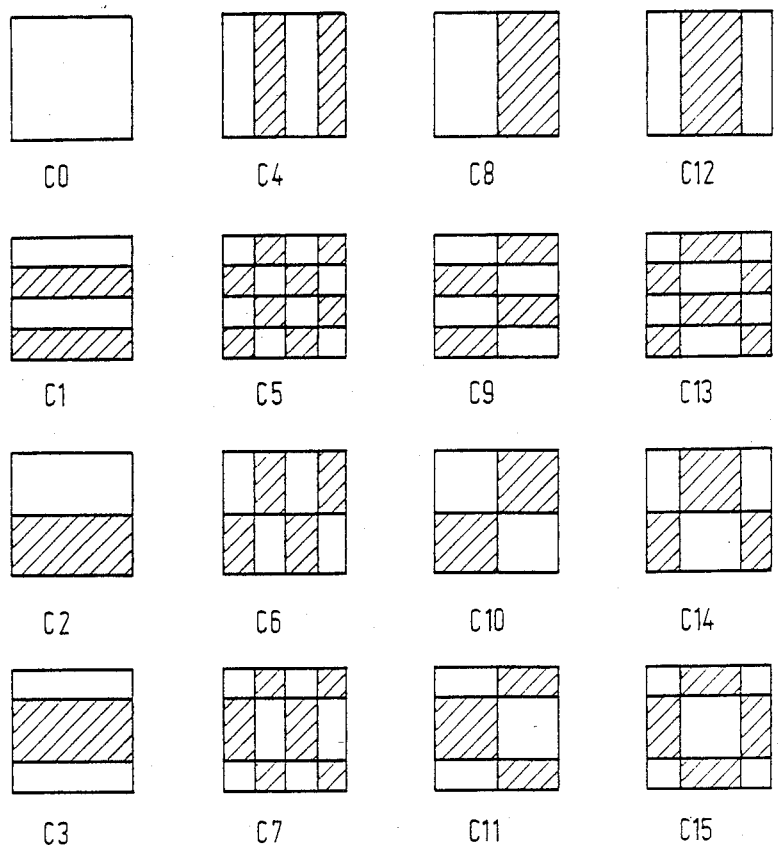
FIG. 3 shows more relevant information for a subpicture consisting of 4×4 pixels.
Figure 4:
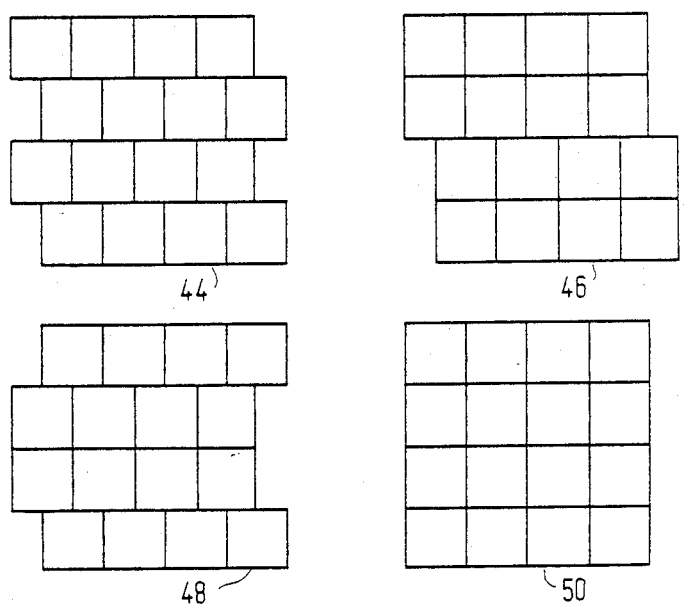
FIG. 4 shows some configurations of subpictures comprising 4×4 pixels.

As a continuation FIG. 3 shows the sixteen feasible Hadamard functions for approximating a subpicture comprising 4×4 pixels. It is to be noted that this can also be done with subpictures which are not square. However, hereinafter only subpictures comprising 4×4 pixels will be considered. Generally, the number of picture lines and the number of pixels per picture line preferably equals a power of the number two. The number of feasible Hadamard functions for a one-dimensional interval of p pixels (or lines) equals p. FIG. 4 shows four feasible dispositions of a subpicture of 4×4 pixels, a shift of one half pixel period being allowed between the pixels of two successive picture lines. FIG. 4, example 44, shows an attractive configuration of a subpicture for a PAL system and identical configurations of the subpictures; it has been found that the colour difference signals are then embodied in the functions C6 and C7 of FIG. 3 (FIG. 3 does not shown the shift of the picture lines; furthermore, the subpicture concerns only a single frame). FIG. 4, block 46, shows an attractive configuration of a subpicture for an NTSC system and identical configurations of the subpictures; it has been found that the colour difference signals are then embodied in the functions C5 and C7 of FIG. 4.

By combinations of the subpictures shown in FIG. 4 and possibly of their mirror images, a picture can be divided in many ways; within one picture, subpictures of mutually different configuration may also occur. For further details, reference is made to the cited Netherlands Patent Application No. 8004521.

The information of each subpicture is transformed by means of the set of Hadamard functions which is symbolized in FIG. 3, the coefficients being represented by a bit group. FIG. 5 shows five examples for the assignment of a given number of bits to each of these coefficients. The digits in the column 62 correspond to the order of the Hadamard function in FIG. 2. The total number of bits in each column (being the sum of the numbers in the column) always equals 38 in FIG. 5. This means that the same total dynamics can be realized for the luminance of a subpicture, because each Hadamard function has the same mean value, that is to say half the luminance "white" in FIG. 3. The combination of column 60 of FIG. 5 and the subpicture configuration 44 shown in FIG. 4 represents an attractive realization for a PAL system in which the colour difference signals are embodied in the coefficients of the Hadamard functions C6 and C7 of FIG. 3. The five columns shown in FIG. 5 represent the numbers of transformation modes in which the picture can be represented. Notably the first four columns represent many selectable cases. Column 52 represents a "normal" situation with an "average" picture, and the other columns represent cases in which a coefficient which is normally small is "large" in a special case. Such a coefficient can then be represented by a larger number of bits so that it is emphasized.

Column 54 emphasizes C5, C9, C13
Column 56 emphasizes C5, C9, C13,
Column 58 emphasizes C5, C6, C13, C9, the emphasis being at the expense of mainly C0. It is to be noted that such different transformation modes can also be realized when the combination of the column 60 represents the normal mode. The selection from the four (or possibly another number) transformation modes is signalled by a signalling bit group (of two bits in the case of realization according to the columns 52 . . . 58 of FIG. 5). The subpicture of 16 pixels is thus coded by 40 data bits, 38 of which are coefficient bits; this means 2½ bit per pixel. Other adaptive transformation methods are also known per se.

DESCRIPTION OF THE ERROR PROTECTION CODE

In the embodiment in accordance with the invention, six of said 40 data bits which represent the relevant subpicture information are protected by a nonsystematic (n,k)=(12, 6) code, which means that six redundancy bits are added thereto without it being possible to reconstruct any of the six protected data bits from one relevant code bit (in the non-disturbed condition of the code bits). As regards the first four columns of FIG. 5, these six data bits may represent the four most significant bits of the coefficient C0 plus the two bits of the signalling bit group. Alternatively, in the columns 54, 56 and 58, the three most significant bits of C0 plus the most significant bit of C8 may be selected. In column 60 of FIG. 5, the six protected bits may be the four most significant bits of the coefficient of the transformation function C0 and the most significant bits of the functions C6, C7 which represent the colour difference signals.

Figures 8, 9:
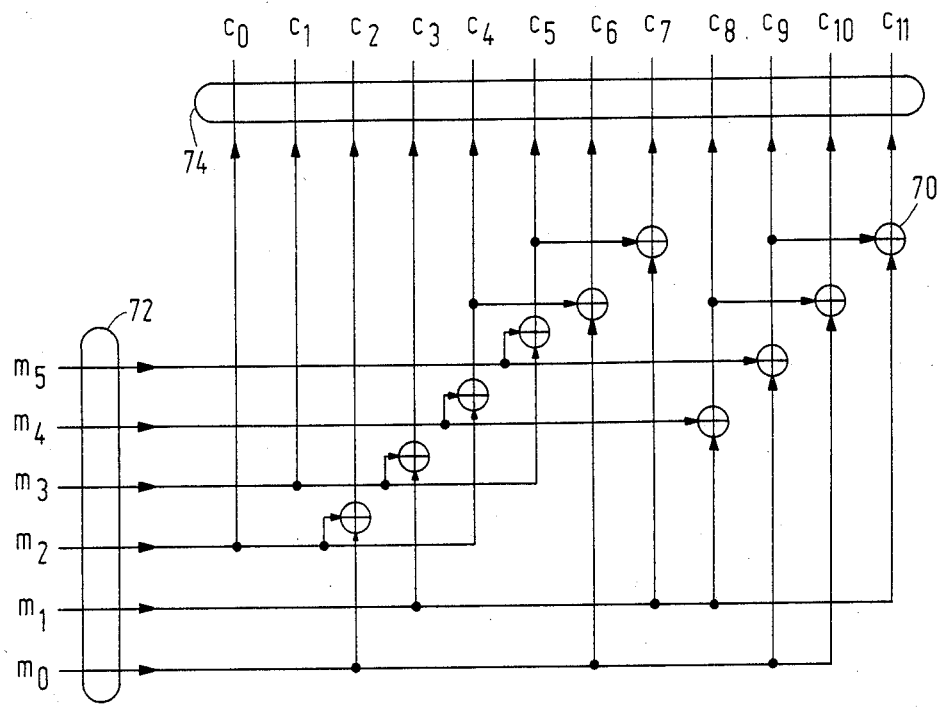
FIG. 8 shows an encoder for this code.
FIG. 9 shows the parity check matrix for the specimen code.

FIG. 6 shows the generator matrix of the speciment code used and FIG. 7 shows the table with the 12-bit code words thus formed (column 64) on the basis of the relevant data words (column 66). Column 68 states the weight of the associated code word, i.e. the number of code bits having the value "1". Ignoring the code word which consists entirely of "0" bits, the minimum weight of a code word equals four. This means that the minimum Hamming distance of the code also equals four, so that at all times one error bit can be corrected in a code word and two error bits can be detected. FIG. 8 shows an encoder for implementing the generator matrix of FIG. 6. The six data bits arrive in parallel on the inputs 72; the twelve code bits are also outputted in parallel on the outputs 74. The matrix is implemented by means of EXCLUSIVE-OR elements such as the element 70. It is alternatively possible to perform the coding operation by means of a read-only memory which comprises (at least) six inputs and twelve outputs. The interleaving, modulation and parallel/series conversion mechanisms have been omitted in this Figure.

When a code word is received which comprises two incorrect bits, it can be detected as being an incorrect code word. In that case there are a number of code words which are situated from the relevant code at a Hamming distance which equals two. For the decoding of this incorrect code word it is not relevant to determine the correct code word from the feasible choices. However, it is important that the most likely correct data word is selected in the case of an incorrect code word. It appears that the table of FIG. 7 can be divided into four subtables. All data words of each subtable have the same value for the two extreme left (most significant) bits. Each code word of a subtable then has a Hamming distance of at least 5 from each code word of each other subtables. For the code word which consists entirely of zeros, this can be verified most easily. Consequently, the two most significant data bits are protected by a code which corrects two bit errors. It also appears that when two bit errors occur in a code word, one in an even position and one in an odd position, correction is also feasible. This appears from the fact that there is no code word having the weight "4" with a "1" in an even bit position as well as in an odd bit position.

FIG. 9 shows the parity check matrix [H] of the specimen code which satisfies [G]·[H]=0. Multiplication of a twelve-bit word by the parity check matrix [H] produces a six-bit syndrome word. If the twelve-bit word is an error-free code word, the syndrome word consists exclusively of "0" bits. FIG. 10 shows a table with the syndrome words. The first two columns state the digital and the binary representation of the syndrome words. The further column states the order of incorrect code bits (0-11) causing the relevant syndrome word. If there are several possibilities, they are separated by a semicolon. For all feasible $2^{12}=4k$ different incorrect words, only those comprising the lowest number of incorrect bits are indicated for each syndrome word. For example, the syndrome word "4" is caused by an eror in code bit "10", the syndrome word "6" by an error in the code bits 3 and 8, the syndrome word "24" by two feasible combinations of two incorrect code bits, the syndrome word "16" by three of such feasible combinations, and the syndrome word "48" by a large number of feasible combinations of three incorrect code bits. Because the code is linear, the effect of disturbances may be summed. The error pattern (4, 8) and the error pattern (5, 9) may be summed and produce the syndrome word "000011". However, this syndrome word now indicates the error pattern (0, 1), and the error pattern (4, 5, 8, 9) is not considered. The same syndrome word "000011" is also found by bit-wise modulo-2 addition of the syndrome words "111111" (63) and "111100" (60), and also by addition of the syndrome words "111101" (61) and "111110" (62). The table states all twelve error words which contain only one incorrect code bit, and also all $66=\frac{1}{2}\times 12\times 11$ incorrect words which contain two incorrect code bits. It appears that the following errors can be corrected:

(a) a single incorrect code bit in a code word is always corrected because a unique syndrome word is associated therewith, (b) two incorrect code bits in a code word are also always corrected if they do not both belong to the even code bits of the code word or both to the odd code bits of the code word, (c) when two code bits of the code word are incorrect, both bits having an even or an odd order number, the two most significant data bits are correct or will be properly corrected. In the case of eight different results for the syndrome word (sixteen feasible error patterns in the code word), one data bit must be guessed. In the case of six other different results for the syndrome word (fourteen feasible error patterns in a code word), two data bits must be guessed. In the case of one different result for the syndrome word (several feasible error patterns), the entire data word must be guessed because in that case at least three code bits are incorrect.

DESCRIPTION OF THE DECODER

Figure 11:
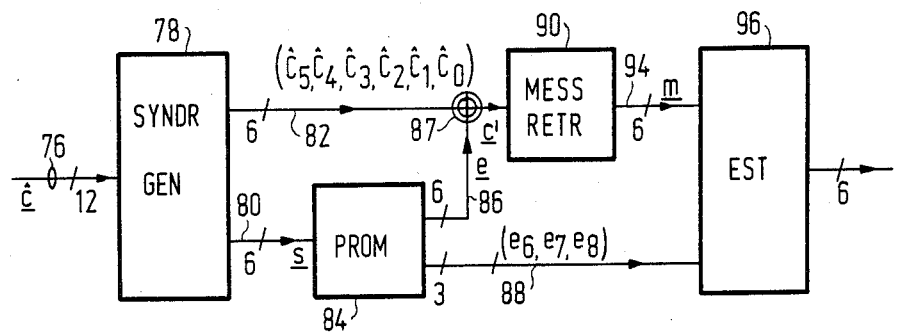
FIG. 11 shows a block diagram of a decoder for the speciment code.

FIG. 11 shows a block diagram of a decoder for use with the described code. The correct or incorrect twelve-bit code words Ĉ arrive on input 76. Element 78 is the syndrome generator which generates a six-bit syndrome word on output 80 by means of the parity check matrix [H], and which conducts the six most significant code bits on output 82. Element 84 is a read-only memory which is addressed by the six syndrome bits; a synchronizing clock system has been omitted for the sake of simplicity. The read-only memory 84 outputs nine error indication bits: six on output 86 and three further error indication bits on output 88. The first six error indication bits $e_0 \ldots e_5$ indicate the errors detected in the six most significant code bits; for $(64-8-6-1)=49$ different syndrome words this is the only correction required. In the multiple EXCLUSIVE-OR element 87 these error indication bits are modulo-2 added to the associated, more significant code bits $\hat{C}_0 \ldots \hat{C}_5$. In element 90, the six-bit data word m' is reconstructed from the six repaired code bits received. The described circuit elements, excluding read-only memory 84, are shown in detail in FIG. 12. FIG. 13 shows a table with syndrome words and the associated groups of error indication bits. The first column of the latter Figure contains a decimal representation of the syndrome words while the second column contains a binary representation. The third column states the six error indication bits appearing on output 86 (FIG. 11) which provide the primary correction. The fourth column states the further error indication bits on output 88 which serve to solve ambiguous cases. The decimal representations of the latter three error indication bits are shown in the last column. The meaning of the latter three error indication bits is as follows:

0: after the operation by means of the six first error indication bits, no further modification of the data content of the six most significant code bits is required.

1: (in this case no correction has been performed in element 87): the entire data word must be guessed because there are more than two incorrect code bits.

2: in addition to the correction performed by the first group of error indication bits, the data bits $m_2$ must be guessed.

3: in addition to the correction performed by the first group of error indication bits, the data bit $m_3$ must be guessed.

4: the correction by the first group of error indication bits has not taken place, data bit $m_4$ must be guessed.

5: the correction by the first group of error indication bits need not be performed, data bit $m_5$ must be guessed.

6: the data bits $m_2$ and $m_4$ must be guessed.

7: the data bits $m_3$ and $m_5$ must be guessed.

Figure 12:
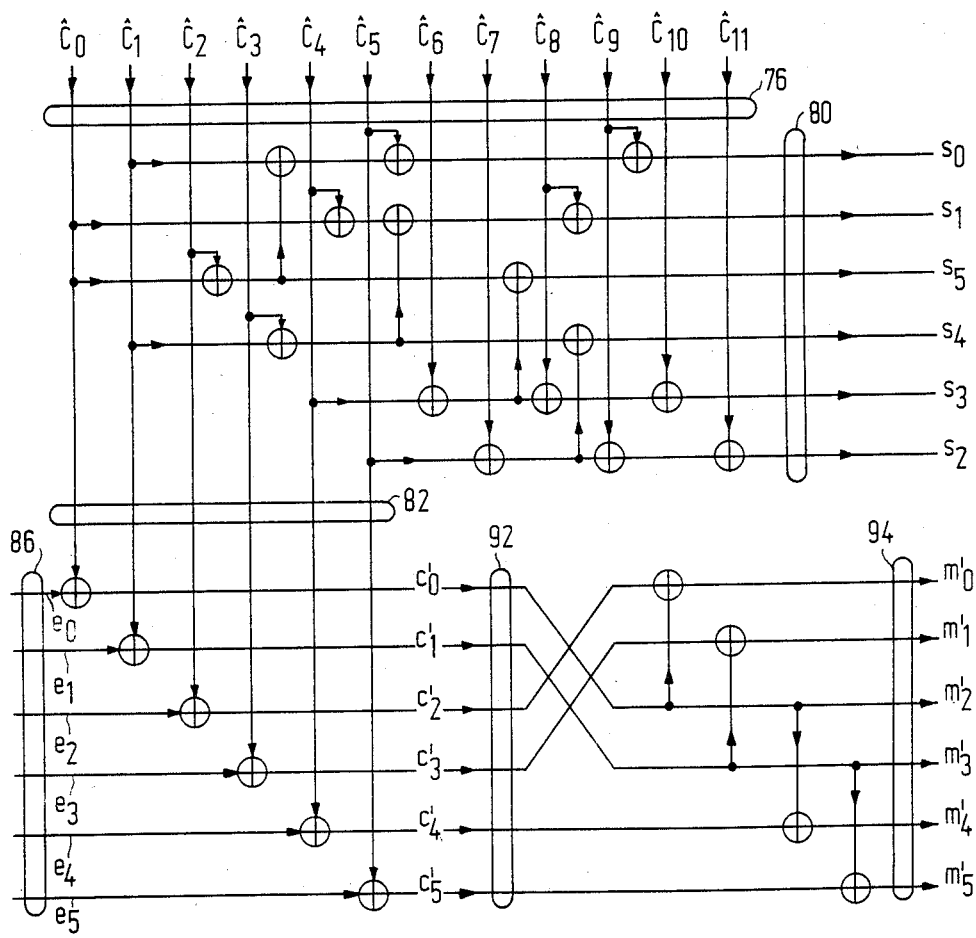
FIG. 12 shows a detail of the decoder.
Figures 14, 15, 16:
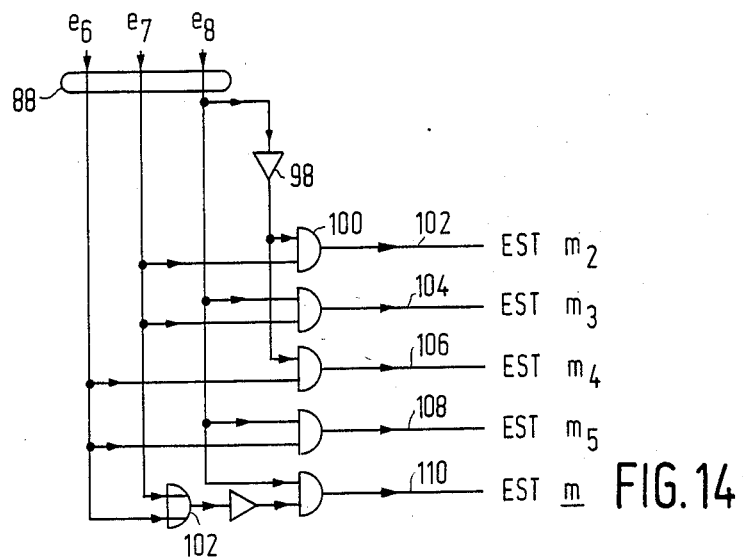
FIG. 14 shows a detail of the decoder.
FIG. 15 shows a table with feasible (n, k) code.
FIG. 16 shows the generator matrix of a (12, 4) code.

The connections 76, 80, 82 and 86 of the circuit shown in FIG. 12 have already been mentioned. The logic operations are again performed by means of EXCLUSIVE-OR-elements. Connection 92 represents the output of the multiple EXCLUSIVE-OR element 87 of FIG. 11. In block 90 of FIG. 11, a provisional six-bit data word is reconstructed from the first six code bits thus provisionally corrected, the reconstructed data word being presented on output 94. The latter connection is also shown in FIG. 12, together with the internal construction of the element 90. The latter can be constructed in the described manner by means of only four exclusive-OR-elements and by cross-wiring in order to modify the sequence of some code bits. In block element 96, the data bits which are not unambiguously defined are guessed under the control of the three last error indication bits. The decoding of the error indication bits is shown in FIG. 14. The circuit shown in FIG. 14 comprises two inverters, such as the element 98, a logic OR-gate 102, and five logic AND-gates such as the element 100. On the outputs 102 . . . 110 the signals necessitating the guessing operation successively appear for the data bits $m_2$, $m_3$, $m_4$, $m_5$ and for the entire data word. The further guessing in the element 96 can be performed in various ways:

a. guessing implies: assuming to be zero: the output signal of FIG. 14 is bit-wise combined with the associated data bits in an OR-function.

b. analogously, guessing may imply: assuming to be "1".

c. guessing implies that the treatment depends on the data content, for example, the value for the preceding subpicture is substituted. Typical properties of the transmission may also be taken into account, for example, the fact that an error from 0 to 1 is more probable than vice versa, or the effect of neighbouring bits may be considered. This is not elaborated herein.

FIG. 15 shows a table for feasible (n, k) codes. The first column states the length of a code word, i.e. the value of n. The second column states the length of a data word, i.e. the value of k. The third column shows the relevant minimum Hamming distance for each of the data bit. Therefore, for a (11, 4) code the two most significant bits are protected against two incorrect code bits, while an additional incorrect bit can be detected. The protection for the other two data bits is less. For some cases more possibilities exist, for example, for the (11, 2) code. Sometimes more than two protection levels are feasible, for example, in the (12, 4) code. The generator matrix of the latter code is shown in FIG. 16.

The code already described with reference to the FIGS. 6, 9 represents a special case of a class of [n, k]=[4n, 2n] codes with n≧3 and Hamming distances for the relevant data bits of (n+2, n+2, 4, 4, ...) where the differences between the Hamming distances are attractive. A very favourable generator matrix for such a code is given by:

$$[G_{4n}] = \begin{pmatrix} e_n & e_n & \phi_n & 1_n \\ 1_n & \phi_n & e_{nn-1} & e_{nn-1} \\ A_{nn-1} & A_{nn-1} & \phi_n & \phi_n \\ \phi_n & \phi_n & A_n & A_n \end{pmatrix}$$

Therein, $e_n$, $\phi_n$ and $1_n$ are vectors having the length of n bits (10000...), (000...) and (111...1), respectively; $\phi_n{}^{n-1}$ is an (n−1)xn matrix consisting exclusively of zeroes; $A_n$ is a matrix comprising a first column consisting exclusively of zeroes, supplemented at the right-hand side by an (n−1)×(n−1) unity matrix. The code according to the FIGS. 6, 9, however, has slightly more attractive properties in the case n=3. It has been found that the codes (4n, 2n) can be decoded with majority logic. This can be elaborated as follows. FIG. 17 first shows the relationship between the code bits c and the data bits m of the FIGS. 6, 9. After tha guesses are given for all data bits (indicated by circonflexes). In the case of a voting deadlock for $m_2$, $m_3$, $m_4$, $m_5$ (2×0, 2×1), the relevant data bit must be guessed.

Assume that there are two bit errors in the word received (the guesses for $m_o$ are considered):

−1 error in the even positions exactly one of the guesses (1), (2) and (3)

1 error in the odd positions is wrong and exactly one of the guesses (4) and (5); therefore the majority is right.

−2 errors in the even positions exactly two of the guesses (1), (2) and (3) are wrong or none of the guesses is wrong; therefore, the majority is right.

−2 errors in the odd positions one or two of the guesses (4) and (5) are wrong; therefore, the majority is right.

Thus, $m_o$ is indeed protected against two errors. The same is applicable to the data bit $m_1$. Once $m_o$ and $m_1$ have been found, they may be used for the guesses for the other, less-protected data bits. These bits $m_2$, $m_3$, $m_4$ and $m_5$ are protected against one bit error, i.e. they can be correctly recovered from the word ĉ received if no more than one bit error is present in ĉ. In the case of two bit errors in ĉ, $m_2$, $m_3$, $m_4$ and $m_5$ will either be correctly decoded or guessed because of the deadlock.

What is claimed is:

1. In a system receiving encoded data for reconstructing a television picture constituted by a plurality of subpictures, said encoded data comprising subpicture data transformed by transformation functions each having a series of a coefficient bits including a most significant bit, said transformation functions having associated frequencies including a lowest frequency, said series of coefficients being encoded in subsets of k bits of said a coefficient bits into code words comprising larger groups of n bits by a predetermined code having a first minimum Hamming distance of four for allowing at least single error correction, double error detection within said k bits, said code further having a second minimum Hamming distance of five for allowing double error correction within an error protected subset of at least two of said k bits, and wherein said k bits contain at least one bit constituting said most significant bit of said coefficient associated with said transformation function having said lowest frequency, decoding apparatus comprising means for receiving each of said code words and generating a syndrome word indicative of errors therein on a first output and a plurality of the most significant code bits of said code word on a second output;

error indication means having an input connected to said first output and a first error indication output for furnishing a plurality of primary error indication bits indicative of errors detected in a corresponding plurality of said most significant code bits;

logic means having a first input connected to said first error indication output and a second input connected to said second output of said receiving and generating means for adding said primary error indication bits to said most significant code bits thereby creating a plurality of repaired code bits; and means connected to said logic means for generating reconstructed data words in response to said repaired code bits.

2. A system as set forth in claim 1, wherein said error indication means further has a second error indication output for furnishing a multiplicity of secondary error indication bits;

wherein a number of said reconstructed data words include ambiguously defined data bits;

further comprising estimating circuit means connected to said reconstructed data words generating means and said error indication means for generating final data words in response to said reconstructed data words under the control of said secondary error indication bits.

3. A system as set forth in claim 2, wherein said error indication means comprises memory means having storage locations addressable by said syndrome words and furnishing said primary and secondary error indication bits from so-addressed storage locations.

4. A system as set forth in claim 2, wherein said logic means comprises a plurality of exclusive OR gates.

5. A system as set forth in claim 2, further comprising display means for displaying said television picture in response to said final data words.

* * * * *